Figure 1:

(No Model.)

G. LORIO.
APPARATUS FOR SUPPLYING SUGAR CANE TO CARRIERS.

No. 567,906. Patented Sept. 15, 1896.

Witnesses:

Inventor:
George Lorio,
by his attorney.

UNITED STATES PATENT OFFICE.

GEORGE LORIO, OF HAHNVILLE, LOUISIANA.

APPARATUS FOR SUPPLYING SUGAR-CANE TO CARRIERS.

SPECIFICATION forming part of Letters Patent No. 567,906, dated September 15, 1896.

Application filed February 17, 1896. Serial No. 579,575. (No model.)

*To all whom it may concern:*

Be it known that I, GEORGE LORIO, a citizen of the United States, residing at Hahnville, in the parish of St. Charles and State of Louisiana, have invented certain new and useful Improvements in Apparatus for Supplying Sugar-Cane to Carriers; and I do hereby declare the following to be a full, clear, and exact description of the invention, such as will enable others skilled in the art to which it appertains to make and use the same.

This invention relates to an improvement in supplying sugar-cane to carriers. Heretofore in devices of this character it has been the practice to construct the frame in which the carrier was located from twenty-four to thirty-six inches above the ground and to have the carrier to work in a plane close to the upper edges of the sides of the frame. This arrangement necessitated the picking up of the cane by armfuls and placing it upon the carrier, a procedure that was slow, laborious, and expensive, as it required the services of three or more men at each carrier to supply the cane thereto. It has also been customary to arrange the carrier at a plane slightly above the ground and to build a platform out from the carrier at such height that the wheels of a vehicle carrying the cane would contact with the platform when backed against it and be chocked thereby while the load was being deposited upon the platform. This construction was also objectionable for the reason that it required the lifting of the cane by armfuls and carrying it to the conveyer. In each of the procedures described the employment of several workmen was required.

It is the object of the present invention to dispose of the carrier with relation to the platform or frame in such manner that any lifting of the cane by the operator will be entirely obviated, and by which one man can with readiness and ease do the work accomplished by three or more men where the old style of conveyer was employed.

To these ends, therefore, the invention consists, generally stated, in arranging the conveyer at or below the level of the ground and placing the dumping-platform at or slightly above the level of the ground, so that the vehicle containing the cane may be driven thereon and deposit its load close to the conveyer, whereby the cane may be readily pushed or hooked into the carrier by a workman standing upon the conveyer or on the platform alongside the load of cane. It will be noted that this form of structure is defined from the old forms already specified in the following particulars—viz., that the vehicle, instead of depositing the load at a point below the conveyer or at a point removed to one side thereof, which was necessary, in the first instance, because the conveyer was arranged above the ground and, in the second instance, because the elevation of the platform prevented the vehicle from being driven thereon, deposits it immediately beside the conveyer, or, if necessary or desired, may deposit it immediately within the conveyer, so that the labor of handling the cane and the employment of workmen in large numbers is obviated.

Figure 2:
Figure 3:
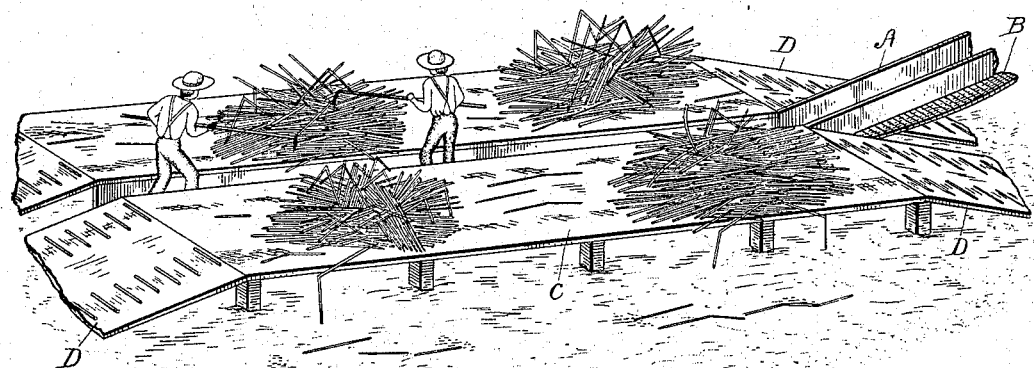

In the accompanying drawings, forming a part of this specification, and in which like letters of reference indicate corresponding parts, Figure 1 is a view in perspective of the old form of carrier, wherein the carrier-frame is shown as raised above the ground, thereby necessitating the lifting of the cane from the ground and depositing it therein. Fig. 2 is a similar view of my preferred form of carrier, wherein the platform is shown as arranged level with the surface of the ground, with the conveyer extended below the surface. Fig. 3 is also a perspective view showing the old form of carrier converted into my improved form by platforms at sides of carrier-frame and ramps at the ends of these platforms.

In any case there may be a single platform with conveyer at side, and the carrier may be in several lengths and driven by the mill-engine or other power, and where several carriers are employed one or more may be run at any desired angle to the mill-carrier.

Referring to the drawings and to Fig. 1 thereof, A designates the carrier-frame, and B the carrier extending practically the entire operative length of the said frame. In this form of apparatus, which is the form in common use, the carrier is arranged at such distance above the ground as to necessitate the lifting of the cane from the ground and placing it upon the carrier by workmen standing upon the ground, as clearly shown. In order to adapt this old form of apparatus to my new form, I build platforms C out from the top of the carrier-frame, and to these platforms I add inclined end ramps D, as shown in Fig. 3. These platforms are above the carrier, so that a vehicle may drive up one end of the platform, dump the cane close to the carrier, and then drive off the other end of the platform, thereby obviating the turning of the vehicle. The cane may then be readily drawn into the carrier by a workman armed with a hook or the like. This latter form of apparatus is exceedingly simple of construction and may be added to the old form of apparatus at but a slight expense.

In Fig. 2 I have shown my preferred form of apparatus, wherein the platforms C are arranged level with or slightly below the level of the surrounding ground and on each side of the carrier, with the body portion of the carrier-frame below the platform and the ground and the carrier B extending down into the said frame, also below the surface of the ground and practically the entire operative length of the platforms and beyond the same. The carrier-frame A is provided with vertical walls extending the length of the platform, the tops of which walls are adjacent to the inner edges of the platform, and the carrier or conveyer is countersunk in the divided platform between the sides of the frame, by which arrangement the workmen may stand on the moving conveyer while drawing the material from the platform thereto. In this form of apparatus the vehicle containing the load is driven upon either platform and the load deposited adjacent to the carrier, whence it may be readily supplied to the carrier in the manner described in connection with Fig. 3. The platforms C in this preferred form of apparatus are shown as level; but it is to be understood that, if desired, they may be slightly tilted or inclined toward the conveyer, and thereby facilitate the feeding of cane thereto.

Having thus fully described my invention, what I claim as new, and desire to secure by Letters Patent, is—

Means for handling cane or other materials, comprising a platform the top whereof adjoins the surface of the ground and on which platform teams may be driven from end to end, a carrier-frame having vertical walls the length of the platform, the tops of which walls are adjacent to the platform, and a carrier or conveyer countersunk below the platform between the sides of the frame and extending substantially the length of and beyond the same, said parts arranged as shown, by which construction the workmen may stand on the moving carrier while drawing the material from the platform thereto, substantially as described.

In testimony whereof I affix my signature in presence of two witnesses.

GEORGE LORIO.

Witnesses:
J. C. TRICHE,
P. C. LORIO.